UNITED STATES PATENT OFFICE.

MICHAEL JOHN MURRAY, OF DUBUQUE, IOWA.

PICKING-BLOCK.

No. 849,011.     Specification of Letters Patent.     Patented April 2, 1907.

Application filed April 5, 1906. Serial No. 310,097.

*To all whom it may concern:*

Be it known that I, MICHAEL JOHN MURRAY, a citizen of the United States, residing at Dubuque, in the county of Dubuque and State of Iowa, have invented a new and useful Picking-Block, of which the following is a specification.

This invention relates to improvements in picking-blocks for chickens, turkeys, and other domestic fowls; and its object is to produce a friable and easily-disintegrated block composed of ingredients having food and other beneficial values for fowls, which block will hold its shape as a block, but may be readily pecked to pieces and devoured by the fowls.

The block consists, essentially, of the following-named ingredients, compounded substantially in the manner which I will now proceed to describe.

I take one-half gallon, by measure, of unslaked lime, one pint of salt, and one-half pint of Venetian red and digest the same in sufficient water to make three gallons. To this is added a sufficient quantity of a mixture composed of equal parts of fine gravel, sand, shelled corn, and finely-divided grain to produce a pasty mass thick enough to be molded. This mass when molded into blocks is allowed to air-dry until hard enough for use, and there is therefore produced a block containing slaked lime, salt, Venetian red, sand, gravel, and grains which because of its consistency will retain its shape, but because of its friability is easily pecked by the fowls, and because it contains food for the fowls will be readily attacked and devoured by the latter.

The block is particularly adapted for a poultry-food by reason of the fact that the fowls in attempting to get the food will at the same time devour the adherent lime and sand.

The quantities of the ingredients given may be varied; but the resultant block should be hard enough to retain its shape under the pecking of the fowls, but should not be so hard but that the fowls may readily peck it to pieces nor so soft as to disintegrate or fall into a powdery condition before it has been devoured by the fowls.

The ingredients are all beneficial to fowls, and being in a form which requires the fowls to expend considerable energy in order to get at the food and other materials of the block will keep them strong and healthy, while at the same time the laying capacity is increased.

Having thus described the invention, what is claimed is—

A friable or easily-disintegrated picking-block for poultry consisting of water-slaked lime, salt, Venetian red, gravel, sand and grains substantially in the proportions specified.

In testimony that I claim the foregoing as my own I have hereto affixed my signature in the presence of two witnesses.

MICHAEL JOHN MURRAY.

Witnesses:
     HARRY T. WALKER,
     WILLIAM L. BECKER.